(12) United States Patent
Imamura

(10) Patent No.: US 6,862,262 B1
(45) Date of Patent: Mar. 1, 2005

(54) OFDM COMMUNICATION DEVICE AND DETECTING METHOD

(75) Inventor: Daichi Imamura, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 874 days.

(21) Appl. No.: 09/830,991

(22) PCT Filed: Sep. 13, 2000

(86) PCT No.: PCT/JP00/06243

§ 371 (c)(1),
(2), (4) Date: May 3, 2001

(87) PCT Pub. No.: WO01/20831

PCT Pub. Date: Mar. 22, 2001

(30) Foreign Application Priority Data

Sep. 13, 1999 (JP) .......................... 11-258912

(51) Int. Cl.[7] ............................... H04J 11/00
(52) U.S. Cl. ..................... 370/210; 370/208; 375/340; 708/404
(58) Field of Search ............... 370/208, 210, 370/328, 338, 310; 375/260, 340; 708/404

(56) References Cited

U.S. PATENT DOCUMENTS 5,838,734 A * 11/1998 Wright ..................... 375/316
6,215,819 B1 * 4/2001 Hyakudai et al. ........... 375/240
6,304,545 B1 * 10/2001 Armbruster et al. ........ 370/210
6,801,586 B1 * 10/2004 Imamura .................... 375/340

FOREIGN PATENT DOCUMENTS

| EP | 0700189 | 3/1996 |
|---|---|---|
| EP | 0859434 | 8/1998 |
| EP | 0998068 | 5/2000 |
| JP | 5219021 | 8/1993 |
| JP | 8265292 | 10/1996 |
| JP | 11205275 | 7/1999 |
| JP | 11239115 | 8/1999 |

OTHER PUBLICATIONS

PCT International Search Report dated Dec. 19, 2000.

* cited by examiner

Primary Examiner—Duc Ho
(74) Attorney, Agent, or Firm—Stevens, Davis, Miller & Mosher, LLP

(57) ABSTRACT

Residual phase error compensation circuit 104 performs differential detection between pilot symbols included in an OFDM signal to compensate for residual phase errors of the OFDM signal and then propagation distortion compensation circuit 105 compensates for propagation distortion of the OFDM signal using the re-coded signal as a known signal.

11 Claims, 17 Drawing Sheets

OFDM COMMUNICATION DEVICE AND DETECTING METHOD

TECHNICAL FIELD

The present invention relates to an OFDM communication apparatus and detection method used in a digital radio communication system.

BACKGROUND ART

A main factor of deterioration of transmission characteristics of surface waves along a transmission path is currently multi-path interference. An OFDM (orthogonal Frequency Division Multiplexing) transmission system resistant to this multi-path interference is becoming a focus of attention in recent years. This OFDM transmission system is a system of multiplexing a multitude (several tens to several hundreds) of mutually orthogonal digital modulated waves in a certain signal section.

A conventional OFDM communication apparatus performs time-frequency conversion on a reception signal through an FFT circuit, carries out a complex multiplication of pilot symbols contained in the reception signal with known signals, and thereby obtains a channel estimation value. Then, the conventional OFDM communication apparatus carries out a complex multiplication of the channel estimation value with information OFDM symbols, and thereby compensates the information OFDM symbols for propagation distortion. Then, the OFDM symbols compensated for propagation distortion are subjected to error correction by an error correction circuit to obtain an information bit string, which reception data.

When long information is transmitted by the conventional OFDM communication apparatus above, as shown in FIG. 1, channel estimation pilot symbols (hatching area) are inserted at predetermined intervals in information OFDM symbols to follow variations in momentarily changing propagation path characteristics. That is, as shown in FIG. 2, the conventional OFDM communication apparatus compensates information OFDM symbols 1 to n using a channel estimation value obtained with pilot symbol A and compensates information OFDM symbols n+1 to 2n using a channel estimation value obtained with pilot symbol B.

However, in the case where such long information is transmitted, it is necessary to frequently insert known signals such as pilot symbols in order to follow time-variations of the propagation path characteristic. Thus, the conventional OFDM communication apparatus has a problem that the transmission efficiency decreases when long information is transmitted.

To solve such a problem, the present inventor previously proposed an OFDM communication apparatus and channel estimation method that would adaptively perform channel estimations using a decision value of the reception signal as a known signal. This makes it possible to maintain a low error rate by adaptively following time-variations of the transmission path characteristics without reducing the transmission efficiency even when long information is sent and there are great time-variations in the propagation path characteristic.

However, with the OFDM communication apparatus and channel estimation method above previously proposed by the present inventor may have problems as shown below when a residual phase error exists. The "residual phase error" refers to a phase error due to a frequency offset that has escaped being compensated by carrier frequency offset compensation and phase noise of a frequency synthesizer.

That is, the OFDM communication apparatus and channel estimation previously proposed by the present inventor adaptively updates a channel estimation value using a signal obtained by re-coding the reception signal subjected to error correction or a signal obtained by applying a hard decision to the reception signal compensated for propagation distortion and at the same time compensates for a residual phase error. However, since the amount of time variation of the residual phase error is greater than the amount of time variation of the phase error due to a variation of the propagation path characteristic, it is necessary to compensate for the residual phase error only using a newly estimated channel estimation value in order to adaptively update the channel estimation value and at the same time estimate/compensate the residual phase error.

However, when the residual phase error is compensated only using the newly estimated channel estimation value, the error of the channel estimation value will increase in the case where there is an error in the error-corrected information bit or hard-decided information symbol. Furthermore, compensating for the residual phase error by only using the newly estimated channel estimation value will make it impossible to ignore an estimation error due to disturbance such as additive noise. Therefore, preventing deterioration of the reception characteristic will require the channel estimation value to be updated using past information.

However, in the case where compensation of propagation distortion using the past channel estimation value is followed by estimation/compensation of the residual phase error using a pilot carrier, it may be impossible to follow phase variations due to a residual phase error with rapid time variations, advancing a phase rotation too far to estimate the residual phase error.

Furthermore, when there is a large error of compensation for propagation distortion by a pilot carrier, the phase variation of the pilot carrier may be added to the residual phase error to be estimated. If the residual phase error is estimated/compensated under this condition, the amount of phase variation of the pilot carrier varies from one subcarrier to another, generating an error in the estimation value of the residual phase error and causing deterioration of the reception characteristic.

DISCLOSURE OF INVENTION

It is an object of the present invention to provide an OFDM communication apparatus and detection method capable of improving the reception characteristic without reducing the transmission efficiency even when there is a great time variation of the propagation path characteristic by adaptively following the time variation of the propagation path characteristic, and improving the reception characteristic without reducing the transmission efficiency even when there is a residual phase error by adaptively following the time variation of the residual phase error.

In order to attain the above object, the present invention estimates/compensates for the residual phase error before carrying out channel estimation and propagation distortion compensation. That is, the present invention carries out a channel estimation using a signal stripped of the residual phase error. Furthermore, the present invention compensates for the residual phase error, which is a variation common to subcarriers included in the reception signal independently of propagation distortion, which is a variation differing from one subcarrier to another by following the irrespective time variations. In this way, the present invention can attain an excellent reception characteristic without reducing the transmission efficiency even when long information is sent in an environment where the residual phase error is not negligible.

BEST MODE FOR CARRYING OUT THE INVENTION

With reference now to the attached drawings, embodiments of the present invention will be explained in detail below.

(Embodiment 1)

Figure 1:
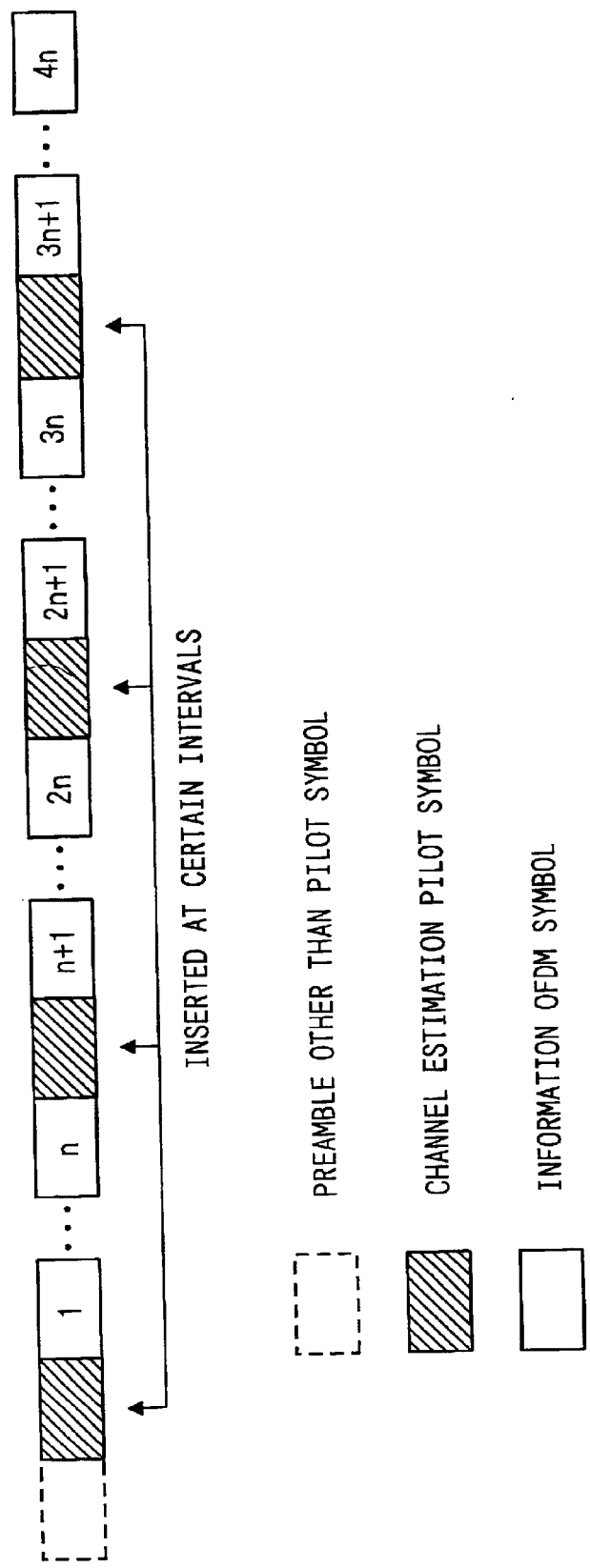
FIG. 1 is a schematic diagram showing a symbol configuration used in a conventional channel estimation method.
Figure 2:
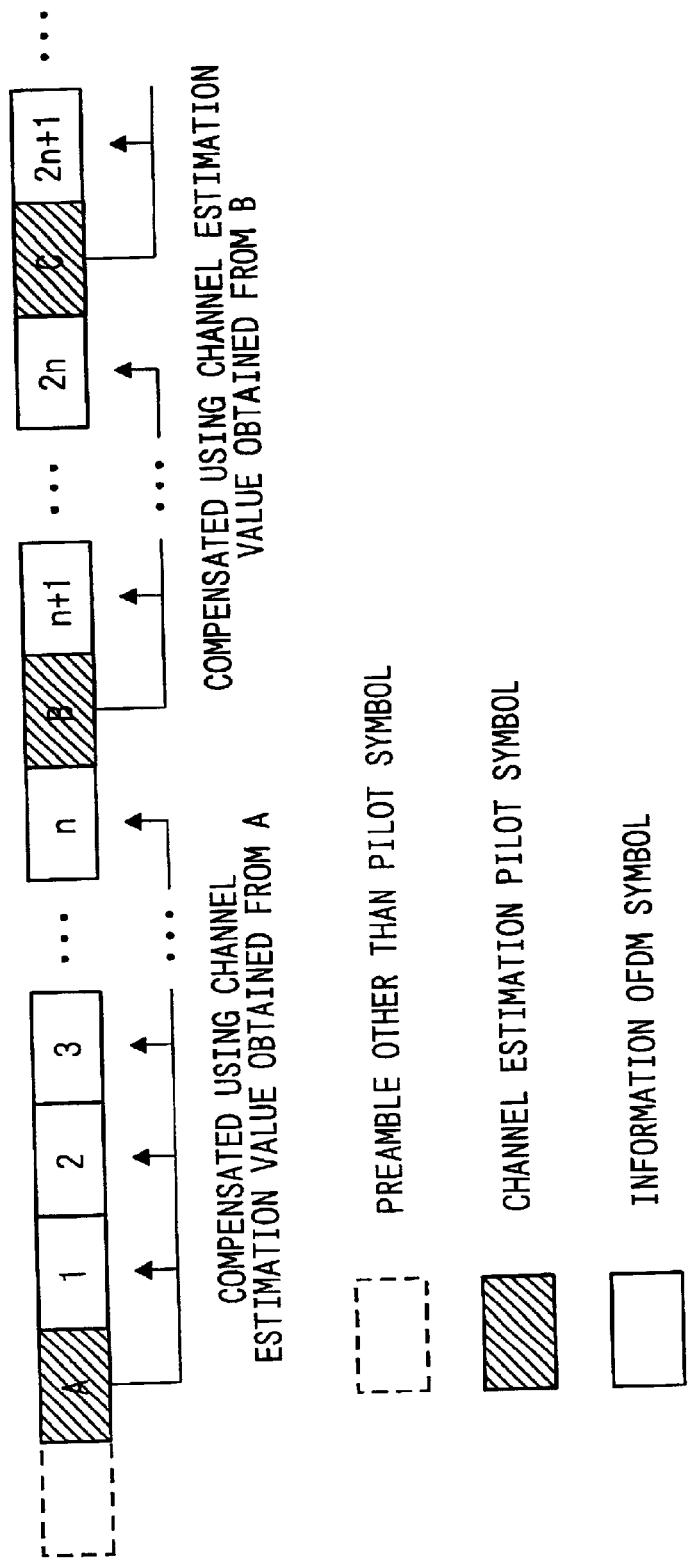
FIG. 2 is a diagram to explain the conventional channel estimation method.
Figure 3:
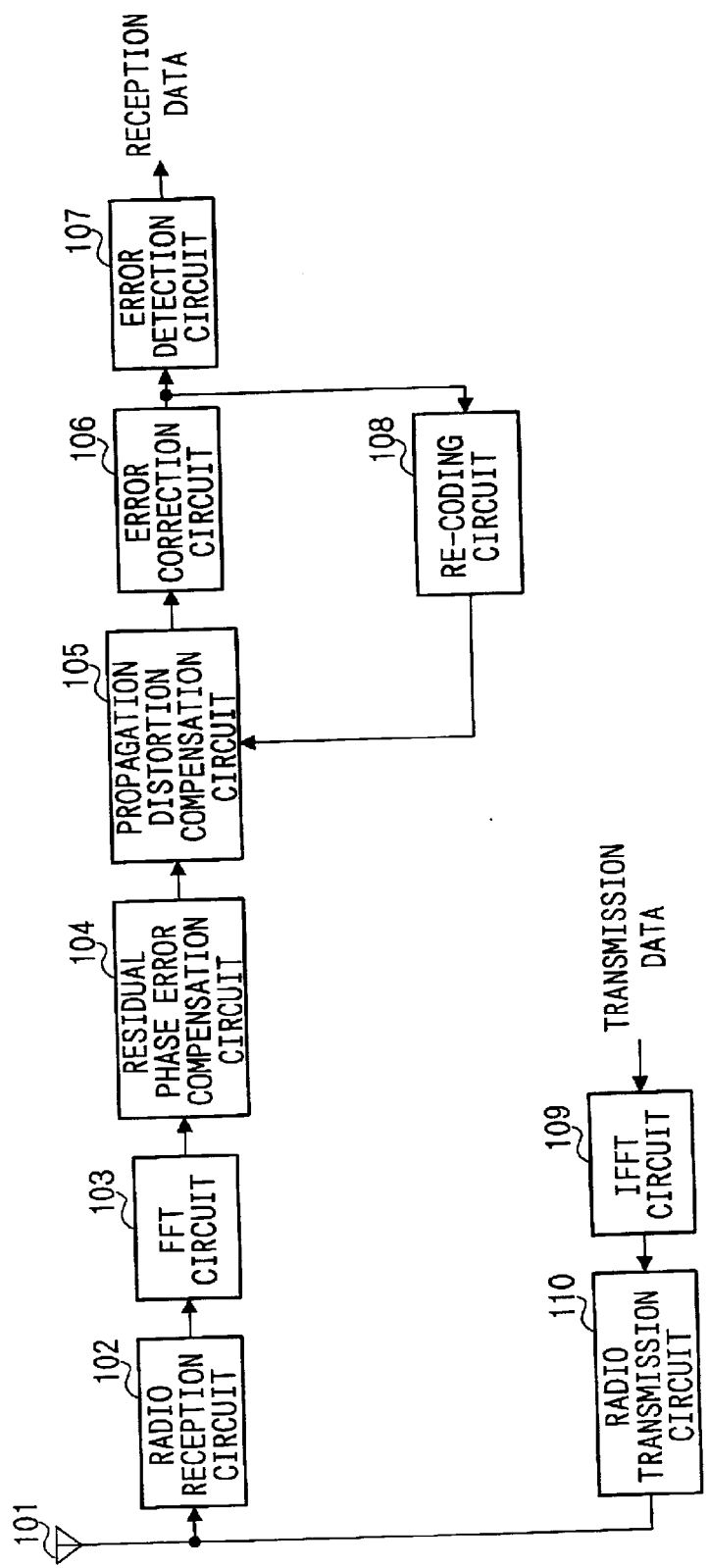
FIG. 3 is a block diagram showing a configuration of an OFDM communication apparatus according to Embodiment 1 of the present invention;.

FIG. 3 is a block diagram showing a configuration of an OFDM communication apparatus according to Embodiment 1 of the present invention.

An OFDM signal received via antenna 101 is subjected to radio reception processing by radio reception circuit 102 and becomes a baseband signal. This baseband signal is subjected to quasi-coherent detection processing by a coherent detector in radio reception circuit 102, stripped of an unnecessary frequency component by a low-pass filter and A/D-converted by an A/D converter. As a result of coherent detection processing, the reception signal is divided into an in-phase component and quadrature component, but these are only expressed as one signal route in the drawing.

This baseband signal is subjected to an FFT (Fast Fourier Transform) calculation by FFT circuit 103. Through this FFT calculation, signals assigned to different subcarriers are obtained. The signal subjected to the FFT calculation by FFT section 103 is sent to residual phase error compensation circuit 104. Residual phase error compensation circuit 104 estimates a residual phase error by carrying out differential detection using pilot symbols included in the reception OFDM signal and consecutively sent. Furthermore, residual phase error compensation circuit 104 compensates for the residual phase error for pilot symbols and all subcarriers of information OFDM symbols from pilot symbols onward based on the estimated residual phase error.

The signal compensated for the residual phase error is sent to propagation path distortion compensation circuit 105. Propagation path distortion compensation circuit 105 performs a channel estimation by carrying out a complex multiplication of pilot symbols included in the reception OFDM signal with known signals. In this way, a first channel estimation value (initial value) is obtained.

On the other hand, propagation path distortion compensation circuit 105 successively performs propagation distortion compensation of information OFDM symbols using the first channel estimation value for every OFDM symbol. The information OFDM symbols compensated for propagation distortion are successively sent to error correction circuit 106 and errors are corrected in error correction circuit 106. Error correction circuit 106 outputs an information bit string, which has been subjected to error correction in coding units. This information bit string is sent to error detection circuit 107 and this information bit string is subjected to error detection in error detection circuit 107. Then, the information bit string after error detection is output as reception data from error detection circuit 107.

The information bit string after error correction is periodically sent to re-coding circuit 108. Re-coding circuit 108 performs re-coding processing, re-modulation processing and rearrangement processing on the error-corrected information bit string. This error-corrected and re-coded information bit string is sent to propagation path distortion compensation circuit 105. Propagation path distortion compensation circuit 105 uses this re-coded information bit string as a known signal. That is, propagation path distortion compensation circuit 105 performs channel estimation by carrying out a complex multiplication of this re-coded information bit string with an FFT-calculated signal to obtain a channel estimation value. Then, propagation path distortion compensation circuit 105 updates the first channel estimation value using this channel estimation value.

Here, to make the estimation accuracy of channel estimation values compatible with the trackability to time-variations of the channel estimation values, it is also possible to update the channel estimation values using past channel estimation values. In this case, too, the reception OFDM signal input to propagation path distortion compensation circuit 105 is already compensated for the residual phase error component with a relatively large amount of time variation, and therefore it is possible to adaptively estimate/compensate phase errors and phase noise with a relatively small amount of time variation generated by variations of the propagation path characteristic with high accuracy.

On the other hand, the transmission data for every subcarrier is digital-modulated according to a modulation system such as QPSK (Quadrature Phase Shift Keying) and QAM (Quadrature Amplitude Modulation) and then input to IFFT (Inverse Fast Fourier Transform) circuit 109. Then, the transmission signal input to IFFT circuit 109 is subjected to an IFFT calculation by IFFT circuit 109 and transformed to an OFDM signal. This OFDM signal is sent to radio transmission circuit 110, D/A-converted, subjected to predetermined radio processing and then transmitted via antenna 101.

Figure 4:
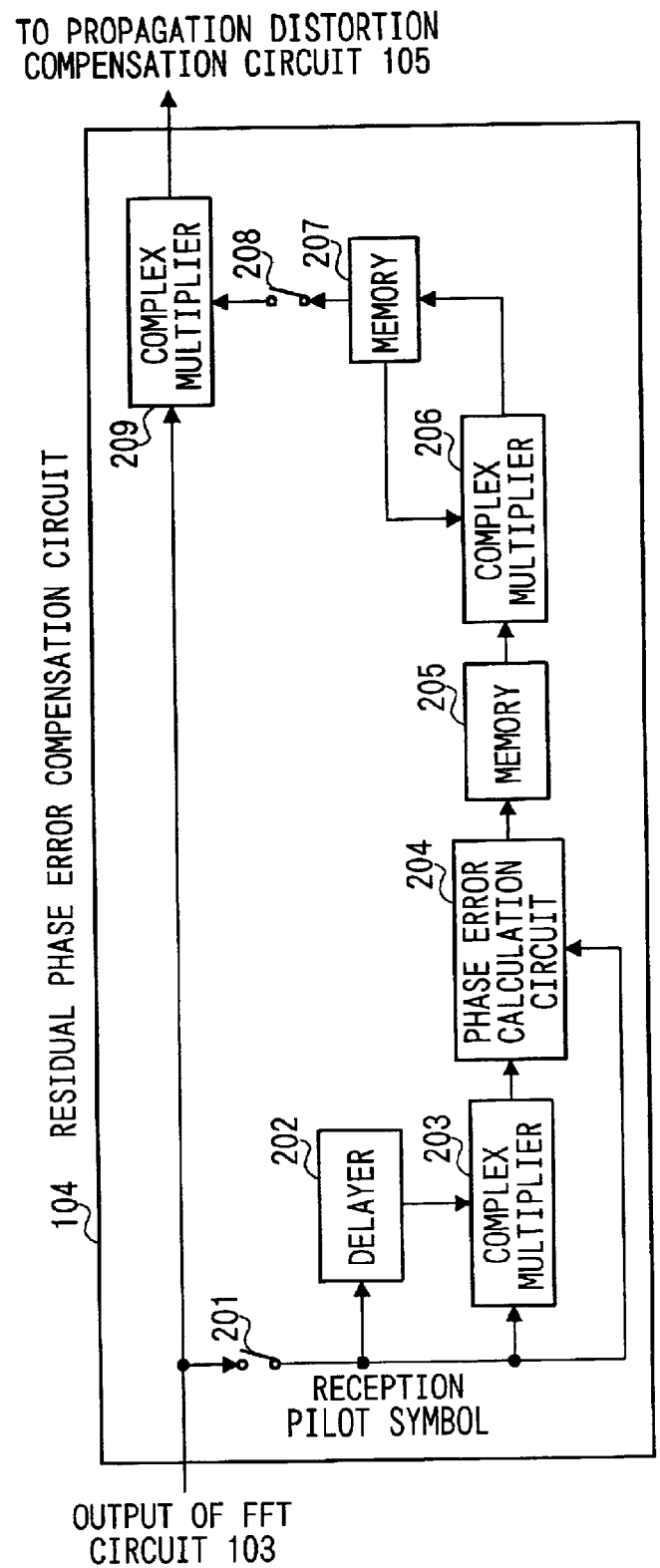
FIG. 4 is a block diagram showing an internal configuration of a residual phase error compensation circuit of the OFDM communication apparatus according to Embodiment 1 of the present invention.
Figure 5:
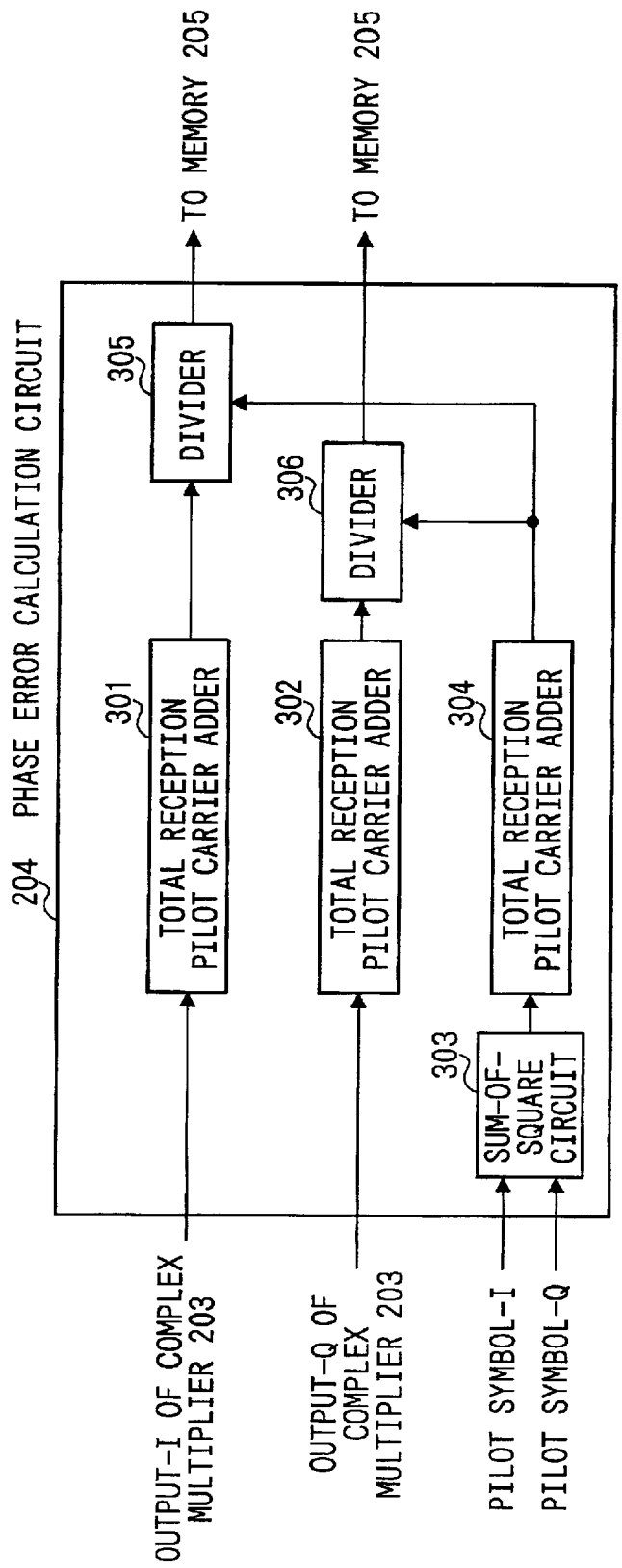
FIG. 5 is a block diagram showing an internal configuration of a phase error calculation circuit in the residual phase error compensation circuit of the OFDM communication apparatus according to Embodiment 1 of the present invention.

Then, the configuration and operation of the residual phase error compensation circuit will be explained using FIG. 4 and FIG. 5. FIG. 4 is a block diagram showing an internal configuration of the residual phase error compensation circuit shown in FIG. 3. FIG. 5 is a block diagram showing an internal configuration of the phase error calculation circuit shown in FIG. 4.

Figure 6:
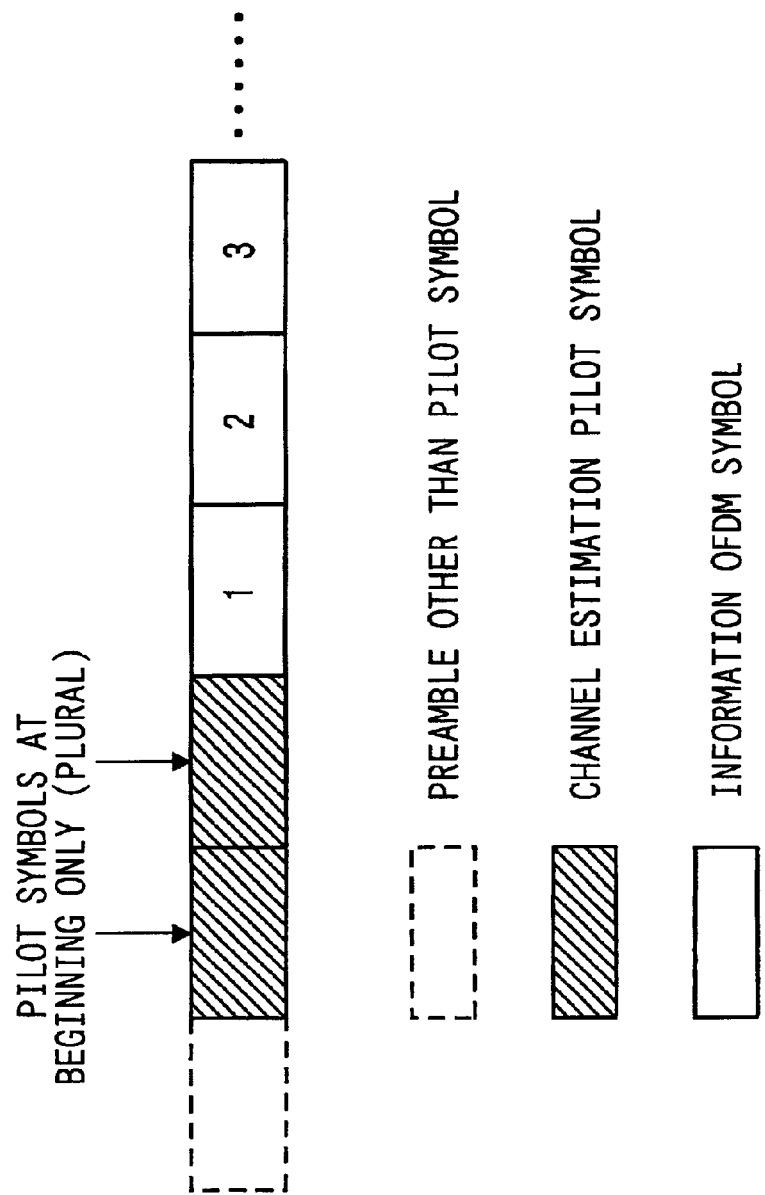
FIG. 6 is a schematic diagram showing a symbol configuration used in a detection method according to Embodiment 1 of the present invention.

The residual phase error compensation circuit shown in FIG. 4 is a circuit that estimates/compensates a residual phase error using a plurality of pilot symbols consecutively transmitted. Furthermore, the symbol configuration used for OFDM communication in this embodiment is as shown in FIG. 6. That is, a preamble other than a pilot symbol is followed by a plurality of channel estimation pilot symbols, which are known signals, and this plurality of pilot symbols is followed by information OFDM symbols.

The first pilot symbol of the FFT-processed reception OFDM signal is input to delayer 202, complex multiplier 203 and phase error calculation circuit 204 under the connection/disconnection control of switch 201. The second pilot symbol is also input in the same way. Then, complex multiplier 203 performs differential detection by carrying out a complex multiplication of the first pilot symbol with the second pilot symbol. In the case where n pilot symbols are sent, differential detection is performed between the ith and (i-1)th pilot symbols. The signal subjected to differential detection indicates a phase difference between two consecutive pilot symbols.

Complex multiplier 203 is set so that differential detection is performed over such a period of time that time variations of the propagation path characteristic are negligible. Therefore, the signal output from complex multiplier 203 only includes a residual phase error component. Then, this signal containing only the residual phase error component is input to phase error calculation circuit 204.

Phase error calculation circuit 204 calculates a residual phase error with high estimation accuracy using the residual phase error of each subcarrier calculated by differential detection. Here, phase error calculation circuit 204 is provided after complex multiplier 203 for the following reason. That is, the residual phase error of each subcarrier calculated by differential detection using pilot symbols and pilot carriers includes additive noise. Thus, using the residual phase error of each subcarrier alone deteriorates the estimation accuracy of residual phase errors. Therefore, phase error calculation circuit 204 is provided after complex multiplier 203 to suppress the noise component using a plurality of residual phase errors calculated from pilot symbols or pilot carriers and calculate residual phase errors with higher estimation accuracy.

Phase error calculation circuit 204 has an internal configuration as shown in FIG. 5, for example. Phase error calculation circuit 204 adds up all differential detection outputs of each pilot carrier output from complex multiplier 203 through total reception pilot carrier adder 301 and total reception pilot carrier adder 302 for the in-phase components (I components) and quadrature components (Q components) separately.

On the other hand, sum-of-square circuit 303 calculates a power value ($I^2+Q^2$) of each pilot carrier and total reception pilot carrier adder 304 adds up all power values of each pilot carrier.

Then, divider 305 and divider 306 normalize (setting the amplitude to 1) the added differential detection output by dividing the added differential detection output by the power addition value.

Adopting a configuration of phase error calculation circuit 204 as shown in FIG. 5 can average residual phase errors obtained from a plurality of pilot carriers and increase S/N. This allows more accurate estimations of residual phase errors.

By the way, the configuration of phase error calculation circuit 204 is not limited to the configuration above. That is, phase error calculation circuit 204 can adopt any configuration if it can at least increase S/N by suppressing the noise component. For example, phase error calculation circuit 204 can adopt 1) a configuration to improve S/N by an equal-gain combining, 2) a configuration to improve S/N by a maximal-ratio combining, 3) a configuration to improve S/N by performing averaging or an equal-gain combinig or maximal-ratio combining using a pilot carrier or pilot symbol carrier exceeding a predetermined threshold, and 4) a configuration using a phase error by a carrier with greatest reception power. All the configurations above are intended to improve S/N of phase error estimation results.

Furthermore, when two or more pilot symbols are used, phase error calculation circuit 204 averages calculation results and can thereby accurately estimate phase errors with the noise component further suppressed.

The output signal from phase error calculation circuit 204 is temporarily stored in memory 205 and then input to complex multiplier 206. In complex multiplier 206, the residual phase error calculated this time is newly accumulated through a complex multiplication to the residual phase error accumulated in memory 207 by a point in time 1 symbol ahead. Then, a newly accumulated value of the residual phase error is stored in memory 207.

The accumulated value of residual phase error is output to complex multiplier 209 at certain intervals under the connection/disconnection control of switch 208. Then, complex multiplier 209 carries out a complex multiplication of the output signal of FFT circuit 103 with the accumulated value of the residual phase error. This compensates the reception OFDM signal for the residual phase error. The reception OFDM signal compensated for the residual phase error is sent to propagation path distortion compensation circuit 105.

Figure 7:
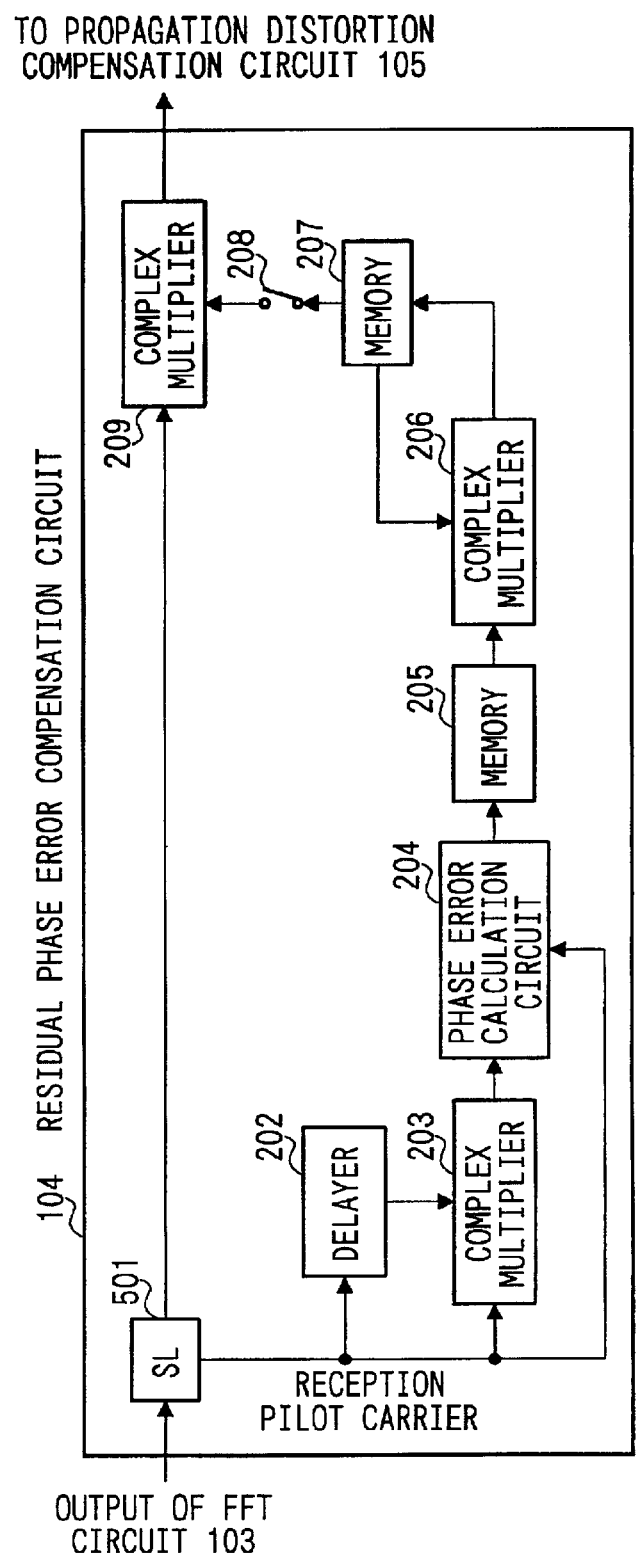
FIG. 7 is a block diagram showing another internal configuration of the residual phase error compensation circuit of the OFDM communication apparatus according to Embodiment 1 of the present invention.

By the way, residual phase error compensation circuit 104 can also use selector 501 as shown in FIG. 7 instead of switch 201 shown in FIG. 4 to estimate/compensate residual phase errors using a pilot carrier inserted between information OFDM symbols.

In this case, the pilot carrier is extracted by selector 501 from the reception OFDM signal output from FFT circuit 103. Signals other than the pilot carrier are input to complex multiplier 209. The pilot carrier extracted from selector 501 is subjected to a complex multiplication with the immediately preceding pilot carrier through the same operation as that described above. In this way, differential detection is performed.

The signal subjected to differential detection is input to phase error calculation circuit 204. Then, phase error calculation circuit 204 calculates an estimation value of the residual phase error. The calculated estimation value of the residual phase error is stored in memory 205.

The estimation value of the residual phase error stored in memory 205 is input to complex multiplier 206 and subjected to a complex multiplication with the past accumulated residual phase error stored in memory 207. In this way, the residual phase error corresponding to 1 OFDM symbol is stored in memory 207. Then, complex multiplier 209 carries out a complex multiplication of the output signal of FFT circuit 103 with the accumulated value of the residual phase error. This compensates the reception OFDM signal for the residual phase error. The reception OFDM signal compensated for the residual phase error is sent to propagation path distortion compensation circuit 105.

Thus, this embodiment accurately estimates/compensates a residual phase error generated by a synchronization shift of the carrier frequency and then performs a channel estimation and distortion compensation. For this reason, according to this embodiment, it is only necessary to follow a variation of the propagation path characteristic for a channel estimation or propagation distortion compensation even if there is a large residual phase error. Thus, this embodiment can perform coherent detection with an excellent reception characteristic even in the presence of a residual phase error.

(Embodiment 2)

The OFDM communication apparatus according to this embodiment differs from the OFDM communication apparatus according to Embodiment 1 in that residual phase errors are estimated/compensated for a time series signal before the FFT processing.

Figure 8:
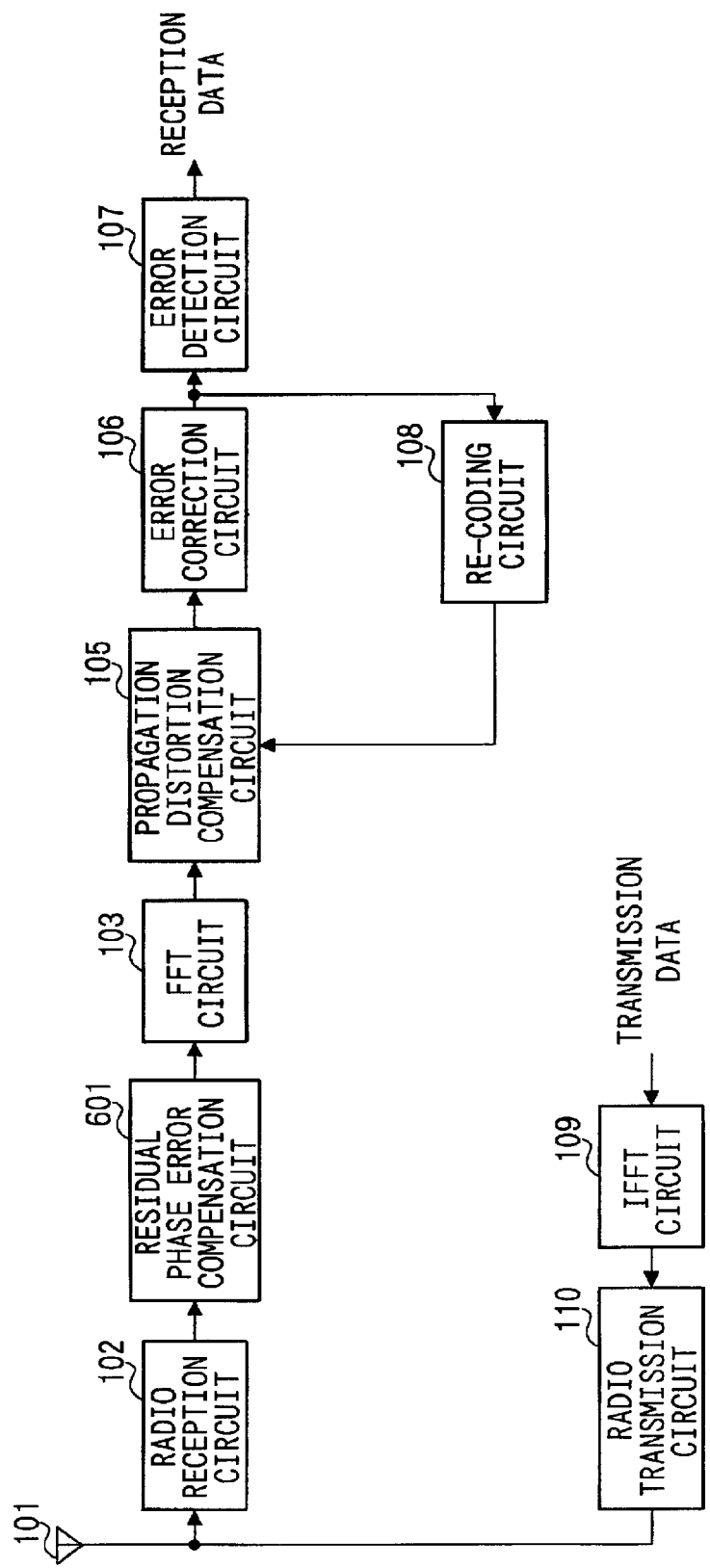
FIG. 8 is a block diagram showing a configuration of an OFDM communication apparatus according to Embodiment 2 of the present invention.

FIG. 8 is a block diagram showing a configuration of the OFDM communication apparatus according to Embodiment 2. The same parts in the configuration in FIG. 8 as those in FIG. 3 are assigned the same reference numerals as those in FIG. 3 and detailed explanations thereof are omitted.

Figure 9:
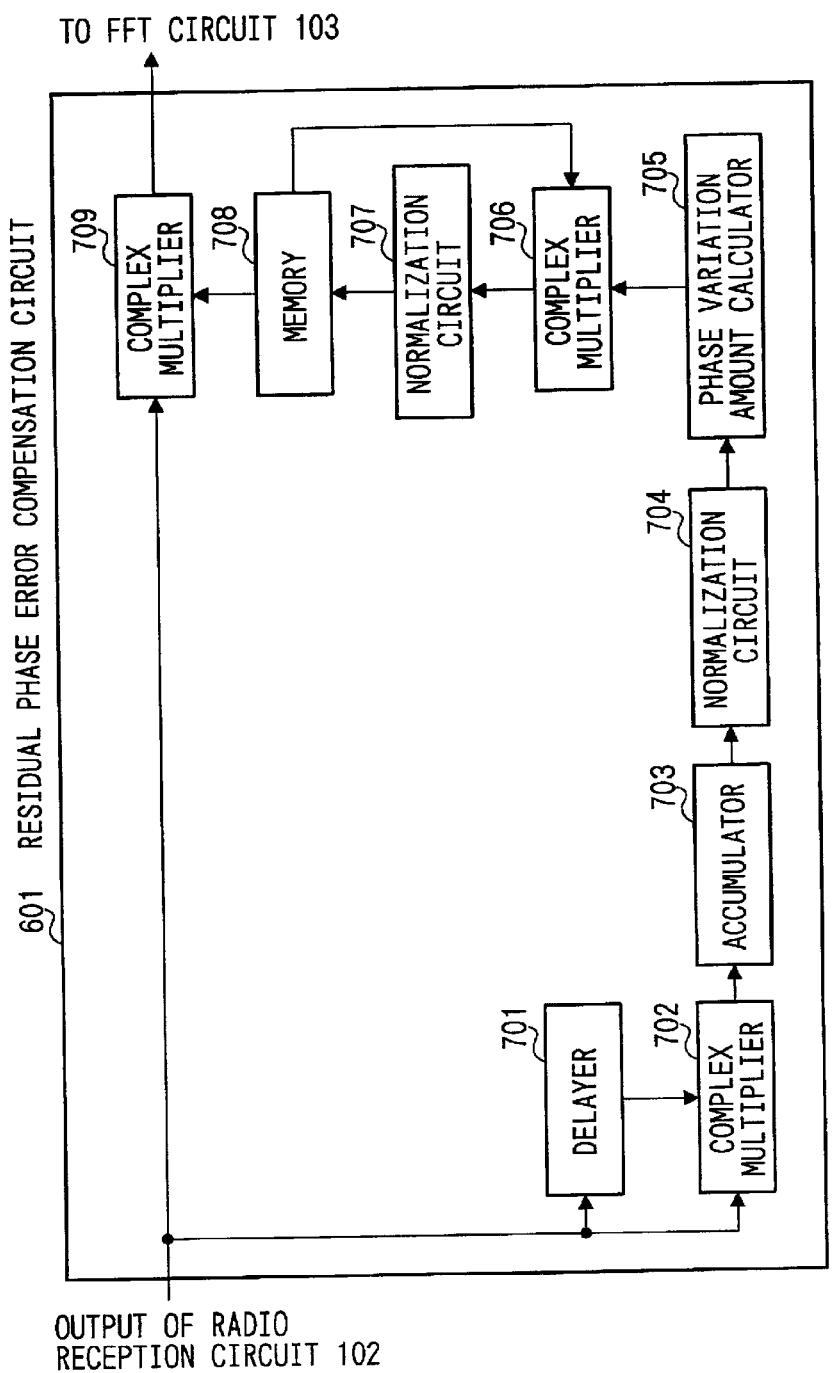
FIG. 9 is a block diagram showing an internal configuration of a residual phase error compensation circuit of the OFDM communication apparatus according to Embodiment 2 of the present invention.

Residual phase error compensation circuit 601 estimates/compensates residual phase errors for an OFDM signal output from radio reception circuit 102. Residual phase error compensation circuit 601 adopts a configuration shown in FIG. 9. FIG. 9 is a block diagram showing an internal configuration of the residual phase error compensation circuit shown in FIG. 8.

A time series signal output from radio reception circuit 102 is input to delayer 701 and complex multiplier 702. Then, complex multiplier 702 performs differential detection by carrying out a complex multiplication on a plurality of pilot symbols consecutively transmitted. The signal subjected to differential detection is input to accumulator 703.

Here, suppose the number of FFT inputs/outputs is N, the reception pilot symbol is R(mT,n), T is 1-OFDM symbol time, m=0, 1, 2, . . . , and n=1, 2, . . . , N. Then, the output after the processing by complex multiplier 702 and accumulator 703 is expressed as shown in expression (1) below:

$$\sum_{n=1}^{N} R(mT, n) R((m-1)T, n) \quad (1)$$

Then, the processing result shown in expression (1) above is normalized by normalization circuit 704 so that the amplitude is set to 1 and the amount of phase variation (complex value) per 1-FFT sampling time is calculated by phase variation amount calculator 705.

The calculated amount of phase variation per 1-FFT sampling time is input to complex multiplier 706. Then, complex multiplier 706 accumulates the amount of phase variation corresponding to 1 sample calculated this time to the amount of phase variation accumulated in memory 708 by a point in time 1 FFT sample ahead. This accumulated amount of phase variation is normalized by normalization circuit 707 so that the amplitude becomes 1 and then stored in memory 708. Then, complex multiplier 709 carries out a complex multiplication of the output signal from radio reception circuit 102 with the amount of phase variation, thereby compensating the reception OFDM signal for the residual phase error.

Thus, as in the case of Embodiment 1, this embodiment accurately estimates/compensates the residual phase error generated by a synchronization shift of the carrier frequency and then carries out a channel estimation and propagation distortion compensation. For this reason, according to this embodiment, it is only necessary to follow a variation of the propagation path characteristic for a channel estimation or propagation distortion compensation even if there is a large residual phase error. Thus, this embodiment can perform coherent detection with an excellent reception characteristic even in the presence of a residual phase error.

(Embodiment 3)

The OFDM communication apparatus according to this embodiment differs from the OFDM communication apparatus according to Embodiment 1 in that the residual phase error compensation circuit compensates residual phase errors using a value obtained by averaging estimation values of the residual phase errors corresponding to a plurality of symbols.

The configuration of the OFDM communication apparatus according to this embodiment is the same as that of Embodiment 1 except the residual phase error compensation circuit, and therefore this embodiment will only explain the residual phase error compensation circuit.

Figure 10:
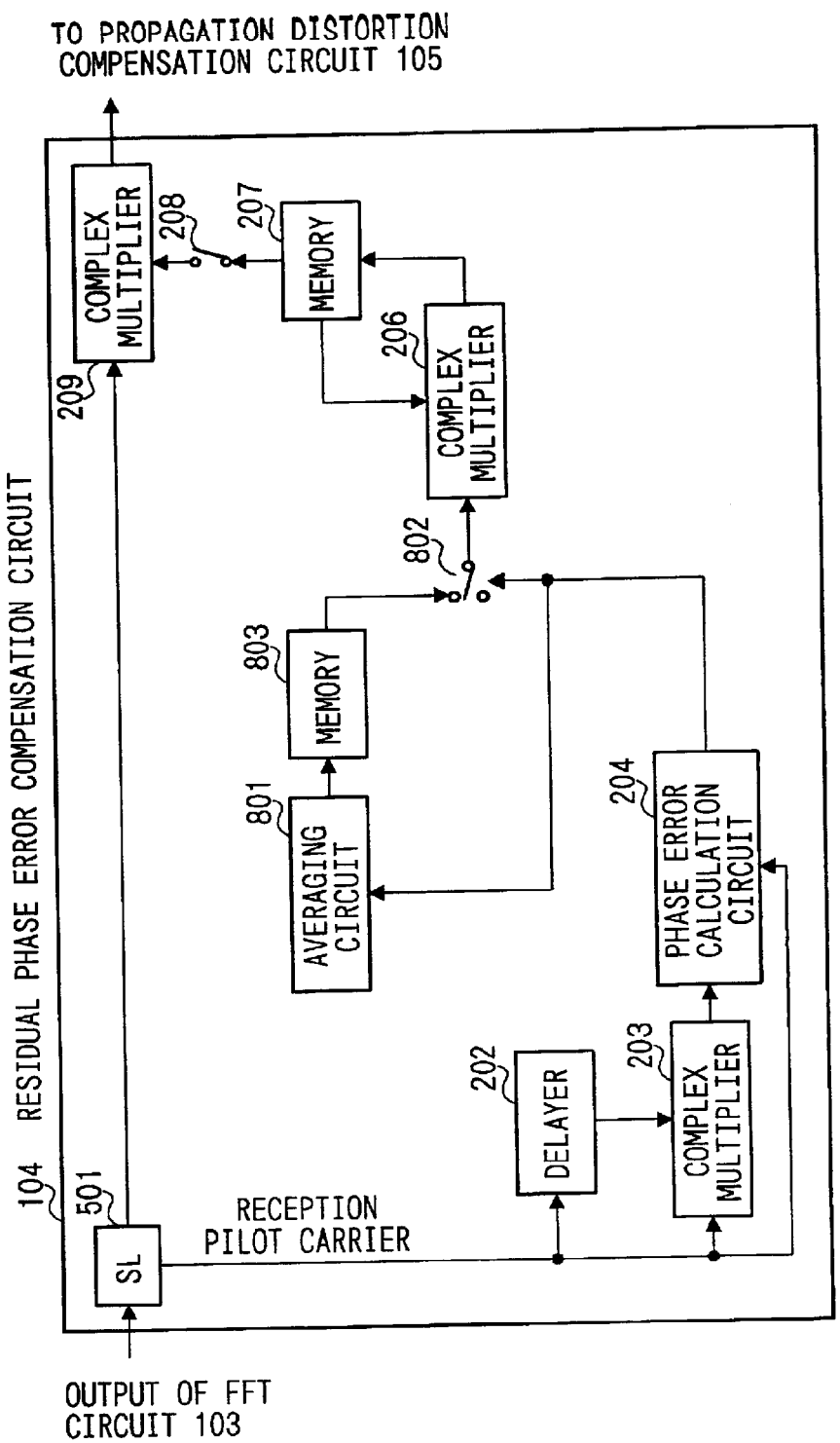
FIG. 10 is a block diagram showing an internal configuration of a residual phase error compensation circuit of an OFDM communication apparatus according to Embodiment 3 of the present invention.

FIG. 10 is a block diagram showing an internal configuration of the residual phase error compensation circuit of the OFDM communication apparatus according to Embodiment 3. The same parts in the configuration in FIG. 10 as those in FIG. 4 are assigned the same reference numerals as those in FIG. 4 and detailed explanations thereof are omitted.

The signal subjected to differential detection is input to phase error calculation circuit 204. Then, phase error calculation circuit 204 calculates an estimation value of a residual phase error. The calculated estimation value of the residual phase error is output to averaging circuit 801 and switch 802.

Averaging circuit 801 calculates an average value of estimation values of residual phase errors corresponding to a plurality of OFDM symbols. Here, the number of symbols "n" used for averaging is set to a value sufficiently small with respect to the amount of time variation of the propagation path characteristic so that the time variation component of the propagation path characteristic of pilot carriers is not included in the residual phase error estimation values.

The averaged residual phase error estimation value is temporarily stored in memory 803 and then output to switch 802. By the way, the method of averaging processing carried out by averaging circuit 801 is not specially limited if the method of averaging processing can at least reduce estimation errors due to additive noise.

Switch 802 switches between the output from phase error calculation circuit 204 and the output of memory 803 to be input to complex multiplier 206. Switch 802 changes the input to complex multiplier 206 so that the output of phase error calculation circuit 204 (that is, estimation values of non-averaged residual phase errors) is directly used for a period of time corresponding to n symbols until the averaging processing is completed and the output of memory 803 (that is, estimation values of averaged residual phase errors) is used after the averaging processing is completed, thereby reducing a processing delay in the residual phase error estimation/compensation processing generated by the averaging processing.

In a period of time required for averaging n symbols, it is also possible to estimate/compensate residual phase errors by successively using the averaged values at that point in time. That is, it is also possible to use an average value from the 1st to ith symbol for the ith (1<i<n) symbol.

The residual phase error estimation value selected by switch 802 is input to complex multiplier 206.

Thus, according to this embodiment, the residual phase error compensation circuit compensates residual phase errors using an average value of residual phase errors estimated by pilot symbols of 2 or more symbols, or pilot carriers of 2 or more symbols, and can therefore perform detection processing with an excellent reception characteristic even in the presence of a residual phase error and at the same time reduce errors of residual phase error estimation value (that is, estimation errors) due to additive noise.

(Embodiment 4)

The OFDM communication apparatus according to this embodiment differs from the OFDM communication apparatus according to Embodiment 1 in that the residual phase error compensation circuit performs a residual phase error estimation by pilot symbols in combination with a residual phase error estimation by pilot carriers, and compensates residual phase errors using the residual phase error estimation values calculated by both estimations.

The configuration of the OFDM communication apparatus according to this embodiment is the same as that of Embodiment 1 except the residual phase error compensation circuit, and therefore this embodiment will only explain the residual phase error compensation circuit.

Figure 11:
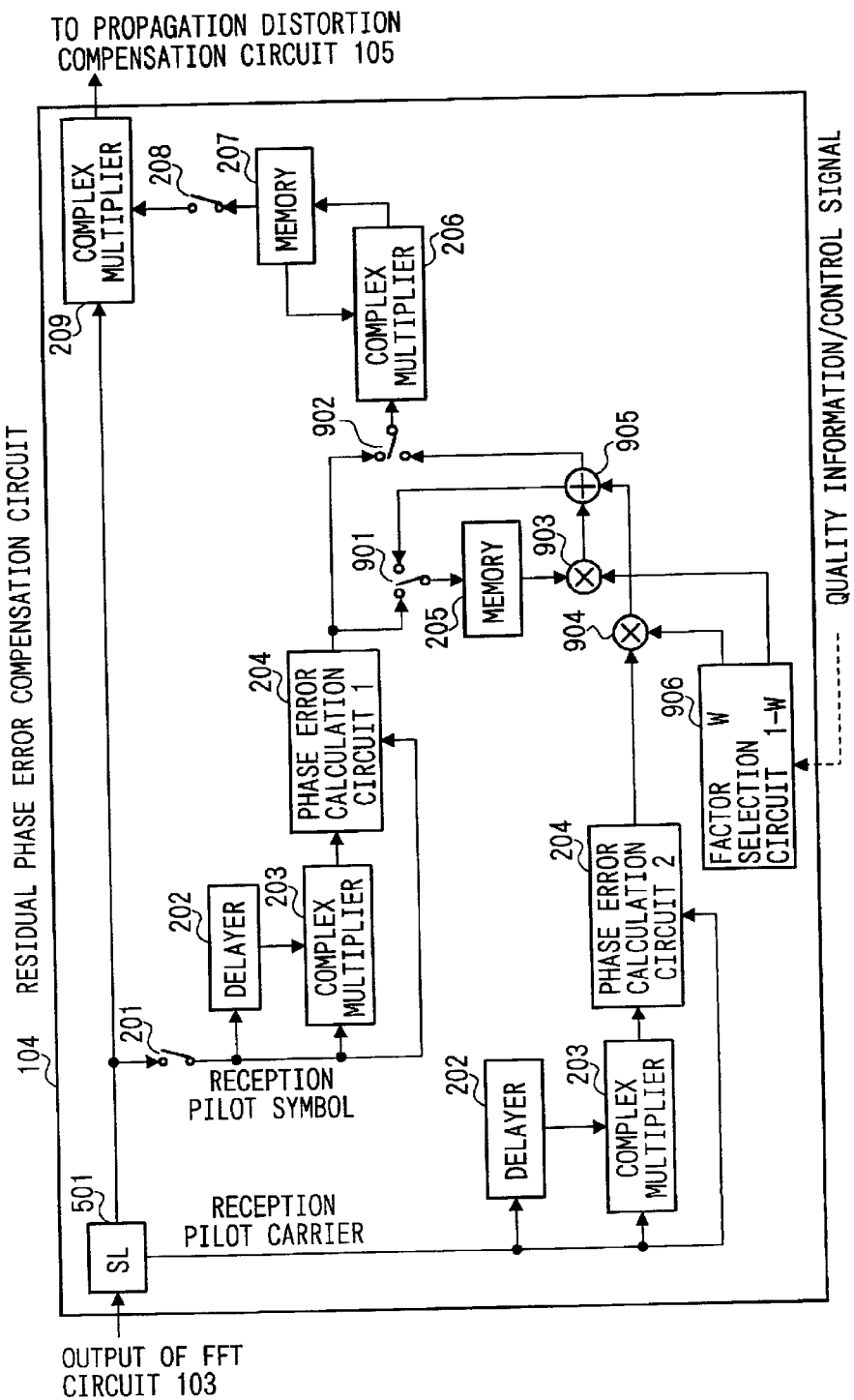
FIG. 11 is a block diagram showing an internal configuration of a residual phase error compensation circuit of an OFDM communication apparatus according to Embodiment 4 of the present invention.

FIG. 11 is a block diagram showing an internal configuration of the residual phase error compensation circuit of the OFDM communication apparatus according to Embodiment 4. The same parts in the configuration in FIG. 11 as those in FIG. 4 are assigned the same reference numerals as those in FIG. 4 and detailed explanations thereof are omitted.

The residual phase error compensation circuit shown in FIG. 11 is a combination of the residual phase error compensation circuit using pilot symbols in Embodiment 1 and the residual phase error compensation circuit using pilot carriers in Embodiment 1.

In FIG. 11, phase error calculation circuit 1 calculates a residual phase error estimation value using the differential detection result of a pilot symbol first. This calculated residual phase error estimation value is output to switch 901 and switch 902. At this time, switch 901 is set so that the residual phase error estimation value calculated from phase error calculation circuit 1 is stored in memory 205 and switch 902 is set so that the residual phase error estimation value calculated from phase error calculation circuit 1 is input to complex multiplier 206.

For information OFDM symbols following a pilot symbol, phase error calculation circuit 2 calculates a residual phase error estimation value using the differential detection result of a pilot carrier. By the way, phase error calculation circuit 1 and phase error calculation circuit 2 adopt the same configuration as that of phase error calculation circuit 204 in Embodiment 1.

Multiplier 903 assigns a weight to the residual phase error estimation value calculated from a pilot symbol stored in memory 205. On the other hand, multiplier 904 assigns a weight to the residual phase error estimation value calculated from a pilot carrier. Then, these weighted residual phase error estimation values are added up by adder 905. Therefore, the output of adder 905 is expressed as shown in expression (2) below:

Output of adder 905=W×(residual phase error estimation value calculated from pilot carrier)+(1−W)×(immediately preceding residual phase error estimation value)  (2)

where, W denotes a weighting factor and is given by factor selection section 906. Factor selection section 906 selects preset weighting factors according to a control signal based on quality information such as channel quality. By the way, a same weighting factor can also be used in all cases.

The addition result in adder 905 is output to memory 205 and complex multiplier 206. At this time, switch 901 is set so that the addition result is stored in memory 205 and switch 902 is set so that the addition result is input to complex multiplier 206.

Thus, according to this embodiment, the residual phase error compensation circuit performs a residual phase error estimation by pilot symbols in combination with a residual phase error estimation by pilot carriers, and compensates residual phase errors using the residual phase error estimation values calculated by both estimations and can thereby perform detection processing with an excellent reception characteristic even in the presence of a residual phase error and estimate residual phase errors with extremely high accuracy.

(Embodiment 5)

The OFDM communication apparatus according to this embodiment differs from the OFDM communication apparatus according to Embodiment 4 in that the residual phase error compensation circuit performs a residual phase error estimation using a value obtained by averaging residual phase error estimation values corresponding to a plurality of symbols.

The configuration of the OFDM communication apparatus according to this embodiment is the same as that of Embodiment 4 except the residual phase error compensation circuit, and therefore this embodiment will only explain the residual phase error compensation circuit.

Figure 12:
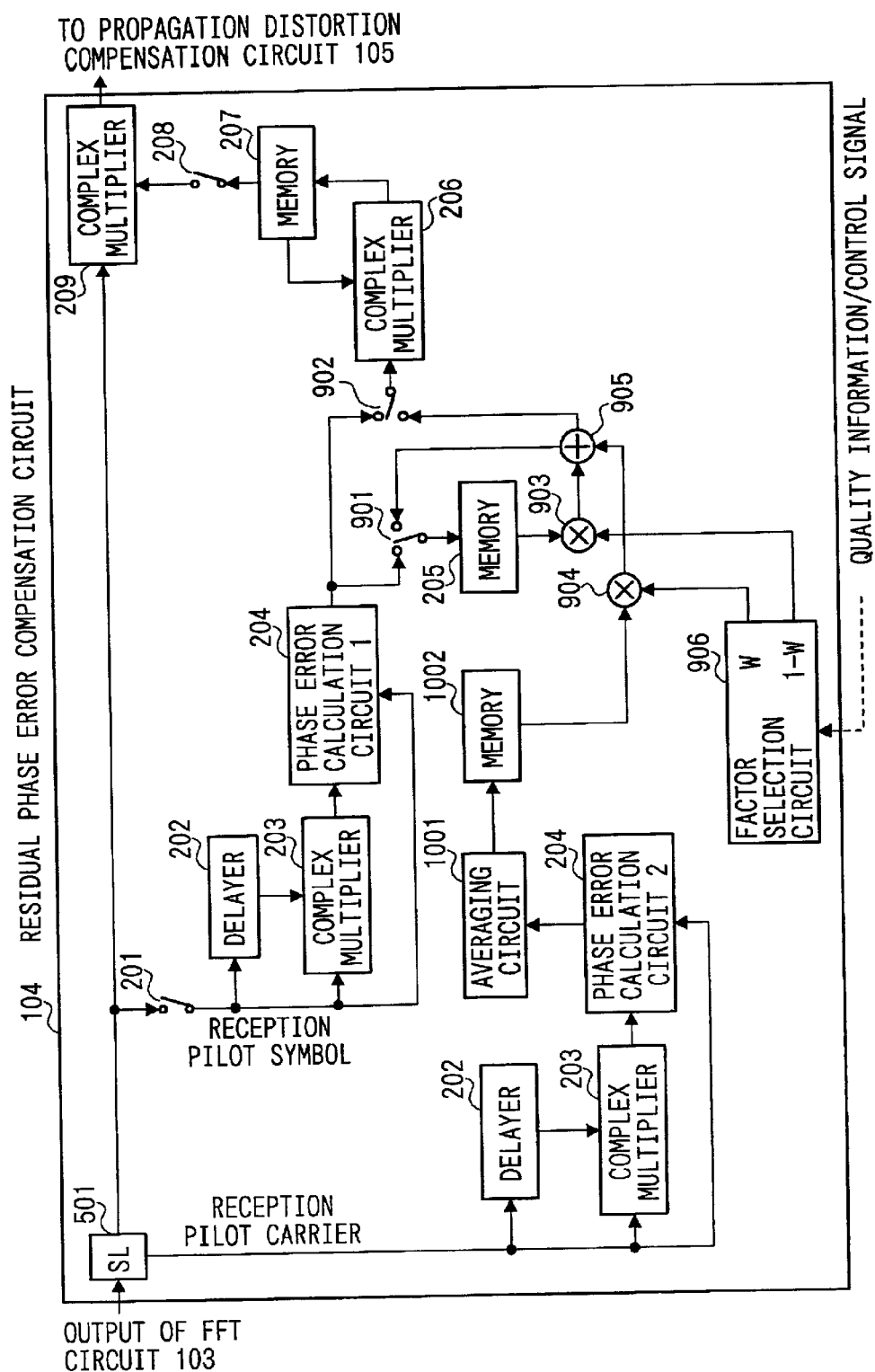
FIG. 12 is a block diagram showing an internal configuration of a residual phase error compensation circuit of an OFDM communication apparatus according to Embodiment 5 of the present invention.

FIG. 12 is a block diagram showing an internal configuration of the residual phase error compensation circuit of the OFDM communication apparatus according to Embodiment 5. The same parts in the configuration in FIG. 12 as those in FIG. 11 are assigned the same reference numerals as those in FIG. 11 and detailed explanations thereof are omitted.

A residual phase error estimation value calculated by phase error calculation circuit 2 is output to averaging circuit 1001.

Averaging circuit 1001 calculates an average value of residual phase error estimation values corresponding to a plurality of OFDM symbols. Here, the number of symbols "n" used for averaging is set to a value sufficiently small with respect to the amount of time variation of the propagation path characteristic so that the time variation component of the propagation path characteristic of pilot carriers is not included in the residual phase error estimation values. The averaged residual phase error estimation value is temporarily stored in memory 1002 and then output to multiplier 904. By the way, the method of averaging processing carried out by averaging circuit 1001 is not specially limited if it can at least reduce estimation errors due to additive noise.

Multiplier 903 assigns a weight to the residual phase error estimation value stored in memory 205. On the other hand, multiplier 904 assigns a weight to the averaged residual phase error estimation value. Then, these weighted residual phase error estimation values are added up by adder 905.

As shown above, according to this embodiment, the residual phase error compensation circuit compensates a residual phase error using a value obtained by averaging residual phase error estimation values corresponding to a plurality of symbols, and can thereby perform detection processing with an excellent reception characteristic even in the presence of a residual phase error and estimate residual phase errors with extremely high accuracy. This embodiment can also reduce errors of residual phase error estimation value (that is, estimation errors) due to additive noise.

(Embodiment 6)

The OFDM communication apparatus according to this embodiment differs from the OFDM communication apparatus according to Embodiment 1 in that FFT processing and a residual phase error estimation are carried out simultaneously.

Figure 13:
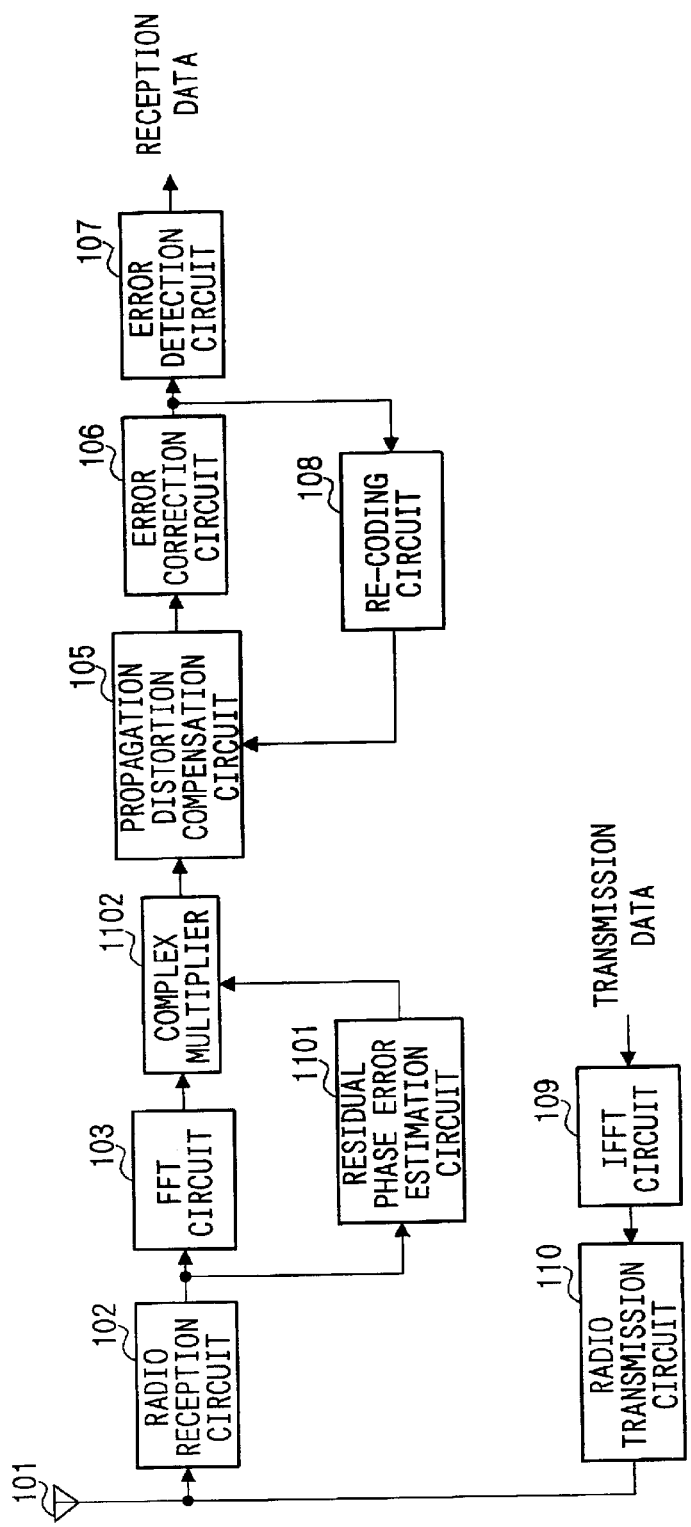
FIG. 13 is a block diagram showing a configuration of an OFDM communication apparatus according to Embodiment 6 of the present invention.

FIG. 13 is a block diagram showing a configuration of the OFDM communication apparatus according to Embodiment 6 of the present invention. The same parts in the configuration in FIG. 13 as those in FIG. 3 are assigned the same reference numerals as those in FIG. 3 and detailed explanations thereof are omitted.

A time series signal output from radio reception circuit 102 is input to FFT circuit 103 and residual phase error estimation circuit 1101 simultaneously. That is, while FFT circuit 103 is performing FFT processing on this time series signal, residual phase error estimation circuit 1101 estimates residual phase errors simultaneously.

Figure 14:
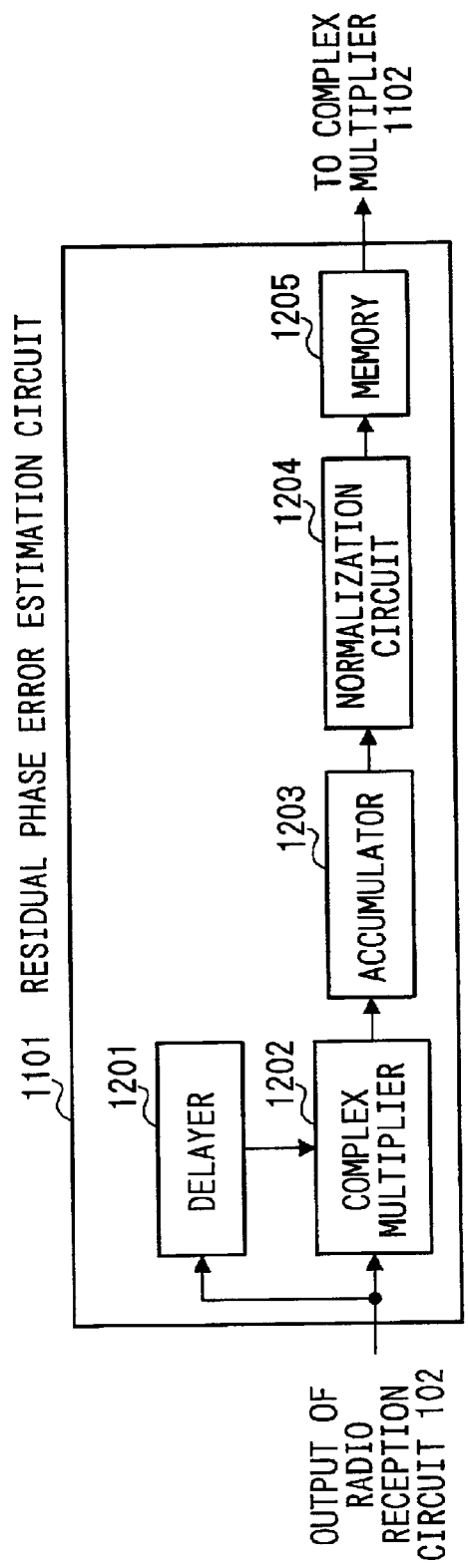
FIG. 14 is a block diagram showing an internal configuration of a residual phase error estimation circuit of the OFDM communication apparatus according to Embodiment 6 of the present invention.

Residual phase error estimation circuit 1101 adopts a configuration as shown in FIG. 14. FIG. 14 is a block diagram showing an internal configuration of the residual phase error estimation circuit shown in FIG. 13.

A time series signal output from radio reception circuit 102 is input to delayer 1201 and complex multiplier 1202. Then, complex multiplier 1202 performs differential detection by carrying out a complex multiplication on a plurality of pilot symbols consecutively transmitted. The signal subjected to differential detection is input to accumulator 1203.

Here, suppose the number of FFT inputs/outputs is N, the reception pilot symbol is R(mT,n), T is 1-OFDM symbol time, m=0, 1, 2, . . . , and n=1, 2, . . . , N. Then, the output after the processing by complex multiplier 1202 and accumulator 1203 is expressed as shown in expression (3) below:

$$\sum_{n=1}^{N} R(mT, n)R((m-1)T, n) \quad (3)$$

Then, the processing result shown in expression (3) above is normalized by normalization circuit 1204 so that the amplitude is set to 1 and thereby a residual phase error estimation value during a 1-OFDM symbol section is calculated and the calculated residual phase error estimation value is stored in memory 1205. Then, complex multiplier 1102 carries out a complex multiplication of the output signal from FFT circuit 103 with the residual phase error estimation value, thereby compensating the residual phase error of the reception OFDM signal.

Thus, this embodiment performs FFT processing and a residual phase error estimation simultaneously and can thereby perform detection processing with an excellent reception characteristic even in the presence of a residual phase error and shorten the time required to estimate/compensate for residual phase errors for a reception signal.

(Embodiment 7)

The OFDM communication apparatus according to this embodiment differs from the OFDM communication apparatus according to Embodiment 1 in that a channel estimation and propagation distortion compensation are followed by a phase noise estimation/compensation.

Figure 15:
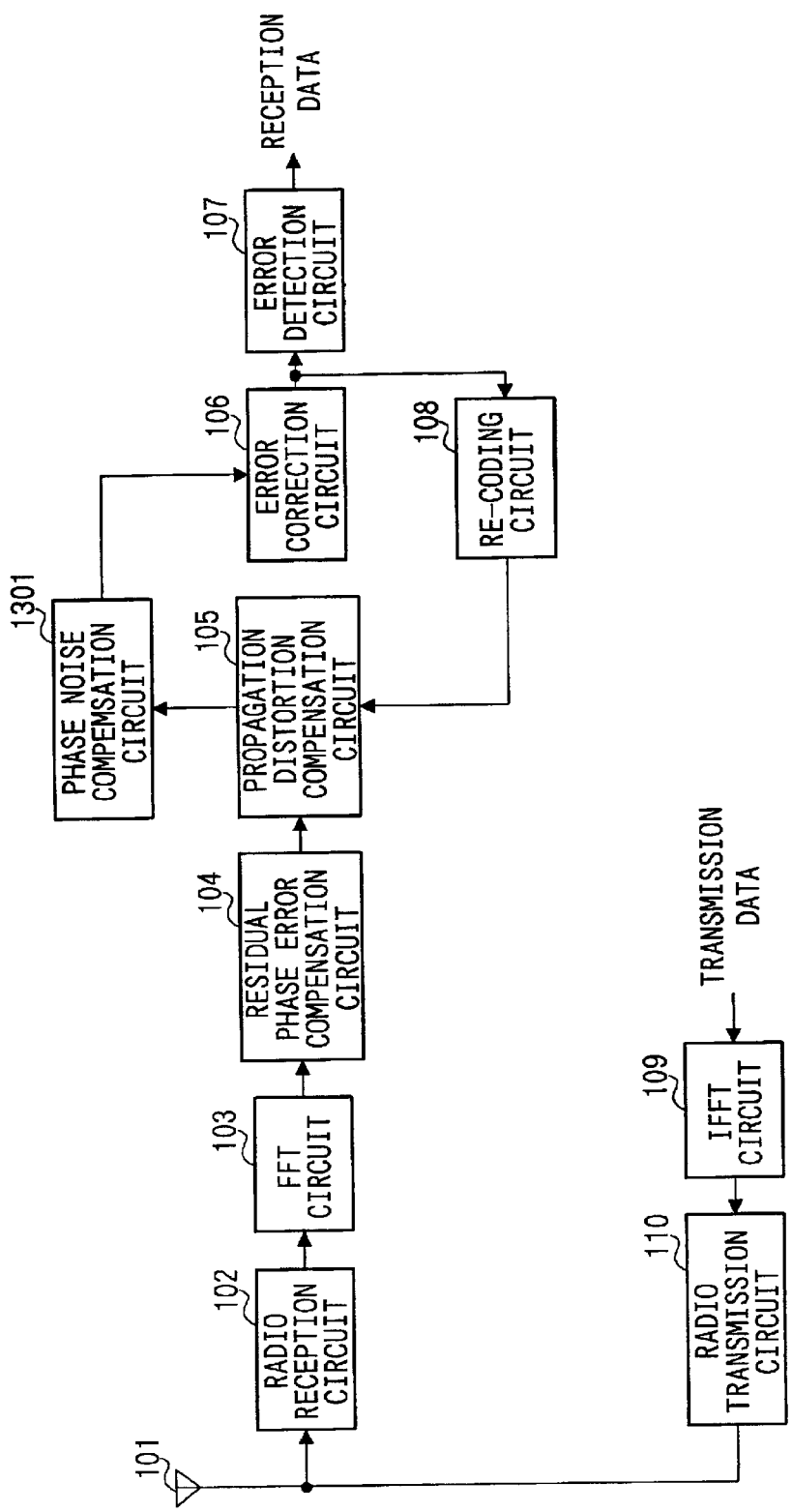
FIG. 15 is a block diagram showing a configuration of an OFDM communication apparatus according to Embodiment 7 of the present invention.

The OFDM communication apparatus according to this embodiment adopts a configuration with a phase noise compensation circuit provided after the propagation path distortion compensation circuit of the OFDM communication apparatus according to Embodiment 1. FIG. 15 is a block diagram showing a configuration of the OFDM communication apparatus according to Embodiment 7. The same parts in the configuration in FIG. 15 as those in FIG. 3 are assigned the same reference numerals as those in FIG. 3 and detailed explanations thereof are omitted.

In residual phase error estimation compensation circuit 104, when a residual phase error estimation value of pilot symbols or an average value of these estimation values corresponding to a plurality of symbols is used, a phase error component by phase noise is not included in the residual phase error. Moreover, once propagation path distortion compensation circuit 105 performs a channel estimation, it compensates for propagation distortion with the same channel estimation value until the next channel estimation is performed, and therefore it is difficult to follow phase noise that varies from one symbol to another except in the case of carrying out batch demodulation. Therefore, this embodiment is intended to solve this difficulty by providing phase noise compensation circuit 1301 after propagation path distortion compensation circuit 105.

Figure 16:
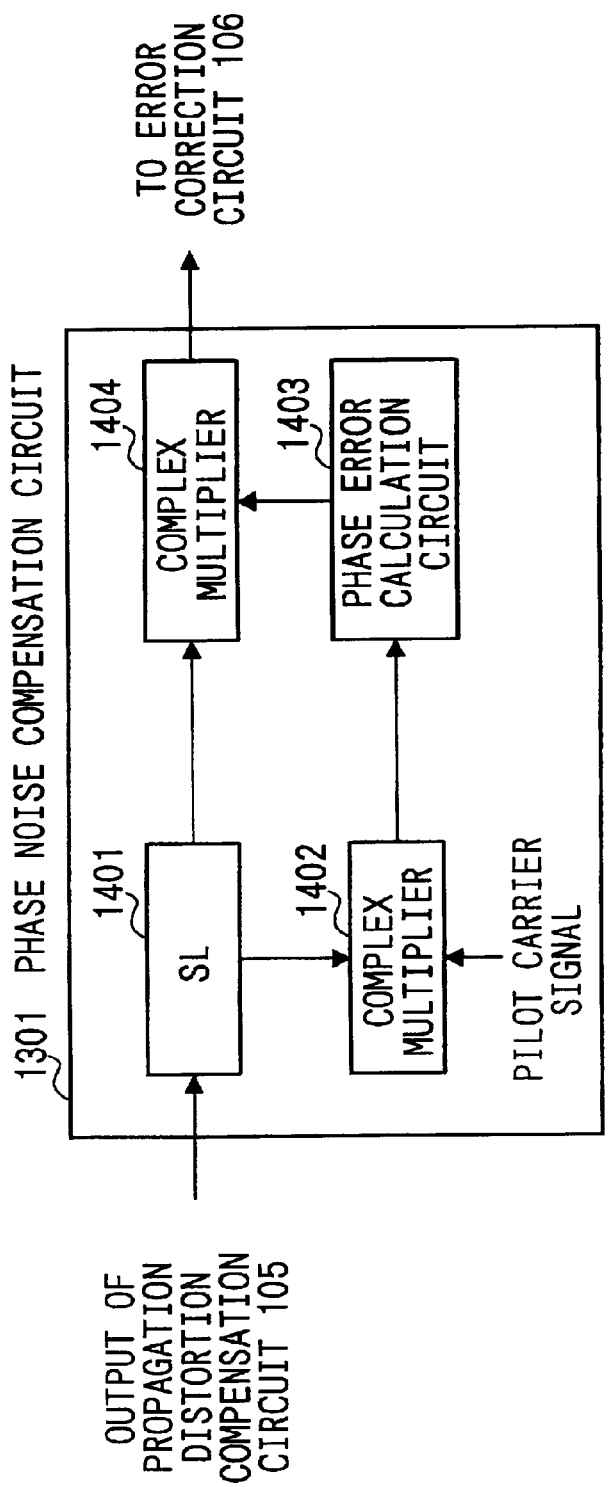
FIG. 16 is a block diagram showing an internal configuration of a phase noise compensation circuit of the OFDM communication apparatus according to Embodiment 7 of the present invention.

FIG. 16 is a block diagram showing an internal configuration of phase noise compensation circuit 1301 shown in FIG. 15. In FIG. 16, selector 1401 extracts a pilot carrier from the reception OFDM signal output from propagation path distortion compensation circuit 105. The pilot carrier is input to complex multiplier 1402 and signals other than the pilot carrier are input to complex multiplier 1404.

The reception pilot carrier input to complex multiplier 1402 is subjected to a complex multiplication with the same pilot carrier signal as the transmission pilot carrier. In this way, a phase error is calculated for every pilot carrier. The phase error calculated from each pilot carrier is input to phase error calculation circuit 1403. Then, phase error calculation circuit 1403 performs processing such as an equal-gain combining or a maximal-ratio combining on each phase error, and can thereby calculate more accurate phase errors. Then, complex multiplier 1404 performs a complex multiplication of the phase error calculated by phase error calculation circuit 1403 with an information carrier, thus compensating the information carrier for phase noise.

As shown above, this embodiment estimates/compensates phase noise after performing a channel estimation and propagation distortion compensation, and can thereby perform detection processing with an excellent reception characteristic even in the presence of a residual phase error and compensate for phase noise, which escapes from being compensated through a residual phase error compensation or propagation distortion compensation.

(Embodiment 8)

The OFDM communication apparatus according to this embodiment differs from the OFDM communication apparatus according to Embodiment 7 in that this embodiment selects whether a residual phase error and phase noise are estimated/compensated or not according to the length of reception information and the amount of phase noise.

Figure 17:
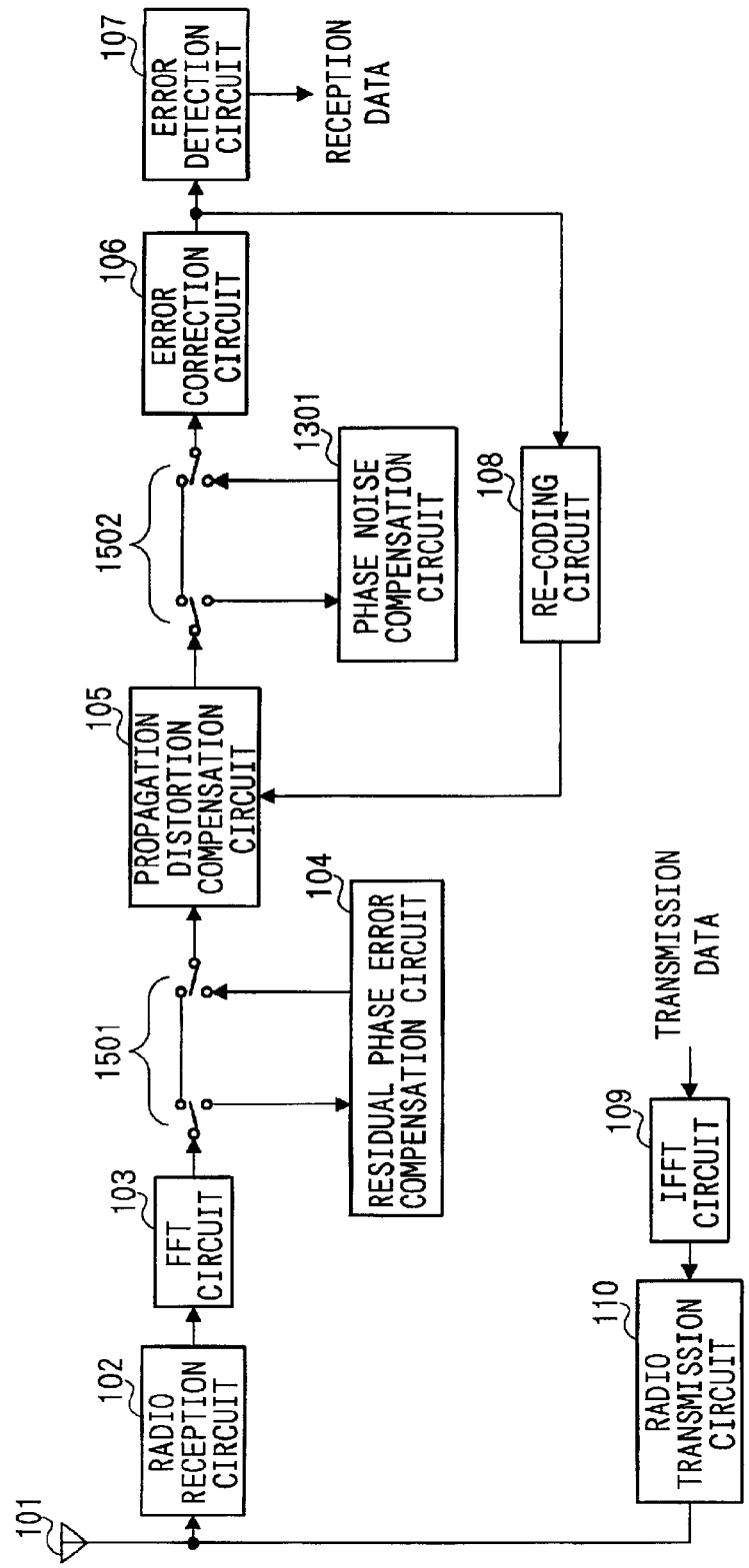
FIG. 17 is a block diagram showing a configuration of an OFDM communication apparatus according to Embodiment 8 of the present invention.

FIG. 17 is a block diagram showing a configuration of the OFDM communication apparatus according to Embodiment 8. The same parts in the configuration in FIG. 17 as those in FIG. 15 are assigned the same reference numerals as those in FIG. 15 and detailed explanations thereof are omitted.

In FIG. 17, in the case where consecutively received symbols are short, switch 1501 is set so that FFT circuit 103 is directly connected to propagation path distortion compensation circuit 105 and switch 1502 is set so that propagation path distortion compensation circuit 105 is connected to error correction circuit 106 via phase noise compensation circuit 1301. That is, when the reception information is short, phase noise is estimated/compensated through coherent detection in the subsequent stage, whereas a residual phase error is not estimated/compensated through differential detection in the preceding stage.

When received symbols are short, this connection state is set for the following reasons. That is, when received symbols are short, a frequency offset can be sufficiently compensated through carrier frequency offset compensation by a preamble and the residual phase error is reduced sufficiently, and therefore it is not necessary to estimate/compensate the residual phase error before a channel estimation and propagation distortion compensation.

It is also possible to estimate/compensate the residual phase error and phase noise before a channel estimation and propagation distortion compensation through residual phase error compensation circuit 104 using differential detection. However, when received symbols are short, the amount of time variation of phase error is small, and therefore it is possible to estimate/compensate phase noise more accurately by phase noise compensation circuit 1301 using coherent detection.

On the other hand, when received symbols are long and phase noise is within a negligible range, switch 1501 is set so that FFT circuit 103 is connected to propagation path distortion compensation circuit 105 via residual phase error estimation compensation circuit 104 and switch 1502 is set so that propagation path distortion compensation circuit 105 is directly connected to error correction circuit 106.

When received symbols are long and phase noise is not negligible, switch 1501 is set so that FFT circuit 103 is connected to propagation path distortion compensation circuit 105 via residual phase error compensation circuit 104 and switch 1502 is set so that propagation path distortion compensation circuit 105 is connected to error correction circuit 106 via phase noise compensation circuit 1301.

By the way, it is also possible to adopt a configuration that allows switching of switch 1501 and switch 1502 to be controlled based on control information indicating the length of symbols received via a channel other than a communication channel.

As shown above, this embodiment selects whether a residual phase error and phase noise are estimated/ compensated or not according to the length of reception information and the amount of phase noise, and can thereby perform detection processing with an excellent reception characteristic and always perform optimal coherent detection with the least wasted processing according to the length of reception information and amount of phase noise.

By the way, Embodiments 1 to 8 above adopt configurations that adaptively perform channel estimations by re-coding an error-corrected reception signal and using the error-corrected re-coded reception signal as a known signal. However, Embodiments 1 to 8 above can also be configured so as to carry out a hard decision on signals before error correction and use the hard-decided signal as a known signal to adaptively perform channel estimations.

Furthermore, the present invention is not limited to Embodiments 1 to 8 above, but can be implemented with various modifications. For example, the present invention can be implemented by combining Embodiments 1 to 8 with one another as appropriate.

As explained above, the present invention can improve a reception characteristic by adaptively following time variations of a propagation path characteristic without reducing the transmission efficiency even when there are great time variations of the propagation path characteristic, and even when there are residual phase errors, further improve the reception characteristic by adaptively following time variations of the residual phase errors without reducing the transmission efficiency.

This application is based on the Japanese Patent Application No. HEI 11-258912 filed on Sep. 13,1999, entire content of which is expressly incorporated by reference herein.

INDUSTRIAL APPLICABILITY

The present invention is applicable to a base station apparatus used in a radio communication system and a communication terminal apparatus such as a mobile station that carries out radio communication with this base station apparatus.

What is claimed is:

1. An OFDM communication apparatus comprising:
a residual phase error compensator that estimates and compensates for a residual phase error of information symbols included in an OFDM signal; and
a propagation distortion compensator that compensates for propagation distortion of the information symbols compensated for the residual phase error by the residual phase error compensator, wherein the propagation distortion compensator compensates for propagation distortion of the information symbols compensated for the residual phase error through a channel estimation value estimated using the information symbols before and after being compensated for propagation distortion.

2. The OFDM communication apparatus according to claim 1, wherein the residual phase error compensator estimates the residual phase error through differential detection using a plurality of known signals included in the OFDM signal.

3. The OFDM communication apparatus according to claim 2, further comprising an FFT processor that performs FFT processing on the OFDM signal, wherein the residual phase error compensator estimates the residual phase error using known signals before FFT processing while the FFT processor is performing FFT processing on information symbols.

4. The OFDM communication apparatus according to claim 1, wherein the residual phase error compensator finds an average value of residual phase errors and uses the average value as the estimation value of the residual phase error.

5. The OFDM communication apparatus according to claim 1, wherein the residual phase error compensator assigns weights to a first residual phase error obtained using a pilot symbol and a second residual phase error obtained using a pilot carrier respectively and uses a value obtained by adding up the weighted first residual phase error and the weighted second residual phase error as the estimation value of the residual phase error.

6. The OFDM communication apparatus according to claim 5, wherein the residual phase error compensator finds an average value of the second residual phase error and assigns a weight to the average value.

7. The OFDM communication apparatus according to claim 1, further comprising a phase noise compensator that estimates and compensates phase noise that escapes from being compensated by the residual phase error compensator and the propagation distortion compensator, through coherent detection using known signals.

8. The OFDM communication apparatus according to claim 7 that switches the state of connection between the residual phase error compensator and propagation distortion compensator and the state of connection between the propagation distortion compensator and phase noise compensator.

9. A communication terminal apparatus equipped with an OFDM communication apparatus, the OFDM communication apparatus comprising:

a residual phase error compensator that estimates and compensates for a residual phase error of information symbols included in an OFDM signal; and a propagation distortion compensator that compensates for propagation distortion of the information symbols compensated for the residual phase error by the residual phase error compensator, wherein the propagation distortion compensator compensates for propagation distortion of the information symbols compensated for the residual phase error through a channel estimation value estimated using the information symbols before and after being compensated for propagation distortion.

10. A base station apparatus equipped with an OFDM communication apparatus, the OFDM communication apparatus comprising:

a residual phase error compensator that estimates and compensates for a residual phase error of information symbols included in an OFDM signal; and a propagation distortion compensator that compensates for propagation distortion of the information symbols compensated for the residual phase error by the residual phase error compensator, wherein the propagation distortion compensator compensates for propagation distortion of the information symbols compensated for the residual phase error through a channel estimation value estimated using the information symbols before and after being compensated for propagation distortion.

11. A detection method comprising:

a residual phase error compensating step of estimating and compensating for a residual phase error of information symbols included in an OFDM signal; and a propagation distortion compensating step of compensating for propagation distortion of the information symbols compensated for the residual phase error by the residual phase error compensator, wherein the propagation distortion compensating step compensates for propagation distortion of the information symbols compensated for the residual phase error through a channel estimation value estimated using the information symbols before and after being compensated for propagation distortion.

* * * * *